(12) United States Patent
Logan et al.

(10) Patent No.: US 7,164,785 B2
(45) Date of Patent: Jan. 16, 2007

(54) APPARATUS AND METHODS OF GENERATION OF TEXTURES WITH DEPTH BUFFERS

(75) Inventors: Ryan Converse Logan, San Antonio, TX (US); Ernest August Franke, San Antonio, TX (US); Eric Conrad Peterson, Leon Valley, TX (US)

(73) Assignee: Southwest Research Institute, San Antonio, TX (US)

( * ) Notice: Subject to any disclaimer, the term of this patent is extended or adjusted under 35 U.S.C. 154(b) by 742 days.

(21) Appl. No.: 10/213,090

(22) Filed: Aug. 7, 2002

(65) Prior Publication Data

US 2003/0031360 A1 Feb. 13, 2003

Related U.S. Application Data

(60) Provisional application No. 60/310,238, filed on Aug. 7, 2001.

(51) Int. Cl.
*G06K 9/00* (2006.01)

(52) U.S. Cl. .................................................. 382/154

(58) Field of Classification Search .............. 382/154, 382/199; 345/419–422; 395/120; 348/47; 378/9, 15
See application file for complete search history.

(56) References Cited

U.S. PATENT DOCUMENTS

| | | | |
|---|---|---|---|
| 4,583,185 A | 4/1986 | Heartz | |
| 4,705,401 A * | 11/1987 | Addleman et al. | 356/606 |
| 5,130,794 A | 7/1992 | Ritchey | |
| 5,140,532 A | 8/1992 | Beckwith, Jr. et al. | |
| 5,166,878 A | 11/1992 | Poelstra | |
| 5,259,037 A | 11/1993 | Plunk | |
| 5,283,640 A | 2/1994 | Tilton | |
| 5,396,583 A | 3/1995 | Chen et al. | |
| 5,864,640 A * | 1/1999 | Miramonti et al. | 382/312 |
| 5,988,862 A * | 11/1999 | Kacyra et al. | 703/6 |
| 6,009,359 A | 12/1999 | El-Hakim et al. | |
| 6,028,584 A | 2/2000 | Chiang et al. | |
| 6,084,979 A | 7/2000 | Kanade et al. | |
| 6,172,754 B1 | 1/2001 | Niebuhr | 356/376 |
| 6,229,546 B1 | 5/2001 | Lancaster et al. | |
| 6,229,549 B1 | 5/2001 | Smith | |
| 6,249,600 B1 * | 6/2001 | Reed et al. | 382/154 |
| 6,256,038 B1 * | 7/2001 | Krishnamurthy | 345/419 |
| 6,271,853 B1 | 8/2001 | Oxaal | |
| 6,590,640 B1 * | 7/2003 | Aiken et al. | 356/3.01 |
| 6,775,403 B1 * | 8/2004 | Ban et al. | 382/154 |

FOREIGN PATENT DOCUMENTS

WO WO 98/40762 9/1998

* cited by examiner

*Primary Examiner*—Joseph Mancuso
*Assistant Examiner*—Jonathan Schaffer
(74) *Attorney, Agent, or Firm*—Oliff & Berridge, PLC (57) ABSTRACT

A three dimensional (3-D) image is generated from a plurality of portions of an image of an object, each captured portion of the image is based on a scan width of an image capture device. A range finding device obtains at least one range data value for each captured portion of the image as at least one corresponding position in each captured portions of the image, and a base to which the image capture device and the range finding device are mounted moves in increments based on the scan width of the image capture device.

17 Claims, 8 Drawing Sheets

APPARATUS AND METHODS OF GENERATION OF TEXTURES WITH DEPTH BUFFERS

This nonprovisional application claims the benefit of U.S. Provisional Application No. 60/310,238, filed Aug.7, 2001.

BACKGROUND OF THE INVENTION

1. Field of Invention

The disclosure is directed to systems and methods for generating textures with depth buffers.

2. Description of Related Art

There is a huge market for photographic images. Everyday, various photographic images are created for a variety of reasons. For instance, people take a photographic image of an event or scene to capture a personal moment. In other instances, a photographic image is taken for its commercial value. However, the image taken is usually two-dimensional, and therefore lifeless. Stated differently, the image lacks depth. To provide realism to their images, various commercial and non-commercial entities have developed three-dimensional (3-D) imaging techniques to create a "virtual reality." Currently, these 3-D images are used in games and entertainment, training simulations, to create virtual museums and libraries, in terrain mapping, and to create virtual buildings and structures, vehicles, animated and non-animated objects and landmarks.

As the basis for generating a portion of a 3-D image, or a complete 3-D image, of an object, techniques have been developed to gather texture, and depth (z-buffer) at various points on the surface of the object, which are then used to create the portion of or the complete 3-D image of the object. A known technique uses stereoscopic imaging equipment having two digital cameras to capture a stereo image of an object. However, prior to capturing the stereo image, the cameras are usually adjusted so that the object can be captured in both cameras to produce the stereo image. Further, when the cameras are adjusted, the cameras are "calibrated" so that the cameras can operate in a common coordinate system. Calibration is important because an object image captured by one camera needs to be cross-referenced with the corresponding object image captured by the other camera. Cross-referencing the two images provides the depth at various points on the surface of the object, which is used to generate the 3-D image of the object.

SUMMARY OF THE INVENTION

For these 3-D imaging applications, a "cloud of dots" is created that represent at least a portion of a complex, irregular 3-D surface of an object. Each dot represents the coordinates of a corresponding point on the object surface in a known 3-axis coordinate system, such as the X, Y and Z axes of a Cartesian coordinate system. Conventional techniques for mapping a 3-D surface include a polygon mesh that approximates the 3-D surface as a combination of polygons connected at their various edges. Each dot represents a vertex of the polygon and defines a boundary of the polygon. However, generating the cloud of dots using the stereo image is mathematically expensive in time and/or processing power and is prone to errors if the cameras are not properly calibrated. Further, texture mapping is performed on the polygons to provide a surface texture and structure to the polygon mesh. Usually, the coordinates of the dots represented by a polygon are cross-referenced with at least one stereo image that provides the texture information of the corresponding points on the image. That portion of the image is then "pasted" on to the polygon. However, this process is also mathematically and computationally expensive and is inaccurate for distant points.

This invention provides systems and methods for generating textures with depth buffers.

This invention separately provides systems and method for associating range values from a range finding device to an object with the pixels of the image capture device.

This invention separately provides systems and methods for capturing a portion of an image and for obtaining a plurality of range values from a portion of the object corresponding to the portion of the image to obtain range values for the portion of the image.

This invention separately provides systems and methods for capturing a portion of an image and for scanning a range finder across a portion of the object corresponding to the portion of the image to obtain range values for the portion of the image.

In various exemplary embodiments, a data collection device collects image data and depth data from which a texture map with depth buffers can be assembled. In various exemplary embodiments, the image data includes a number of image portions and depth data corresponding to the image pixels of each of the image portions. In various exemplary embodiments, each portion is a one-dimensional slice of the image. In various other exemplary embodiments, each portion is a two-dimensional slice or section of the image.

In various exemplary embodiments, each one-dimensional slice is captured using a line scanning camera. The depth data is obtained using a laser range finder. In various exemplary embodiments, the line scanning camera and the laser range finder are mounted to a base plate which rotates in step increments. Each step increment of the camera rotates the camera on a mount no larger than the horizontal scan resolution of the line scanning camera.

In various exemplary embodiments, the data collection device captures a plurality of portions of an image to be captured. Correspondingly, a distance determining device determines a distance or range at one or more positions on the object corresponding to the captured image portion.

The obtained image portions and corresponding depth data can be assembled to form a texture map containing the depth buffers.

The obtained image portions and corresponding depth data can be assembled to form a three-dimensional (3-D) image.

These and other features and advantages of this invention are described in greater detail or are apparent from the following description of the exemplary embodiments.

BRIEF DESCRIPTION OF THE DRAWINGS

This invention will be described with reference to accompanying drawings, wherein like numerals designate like elements, and wherein.

DETAILED DESCRIPTION OF EXEMPLARY EMBODIMENTS

Figure 1:
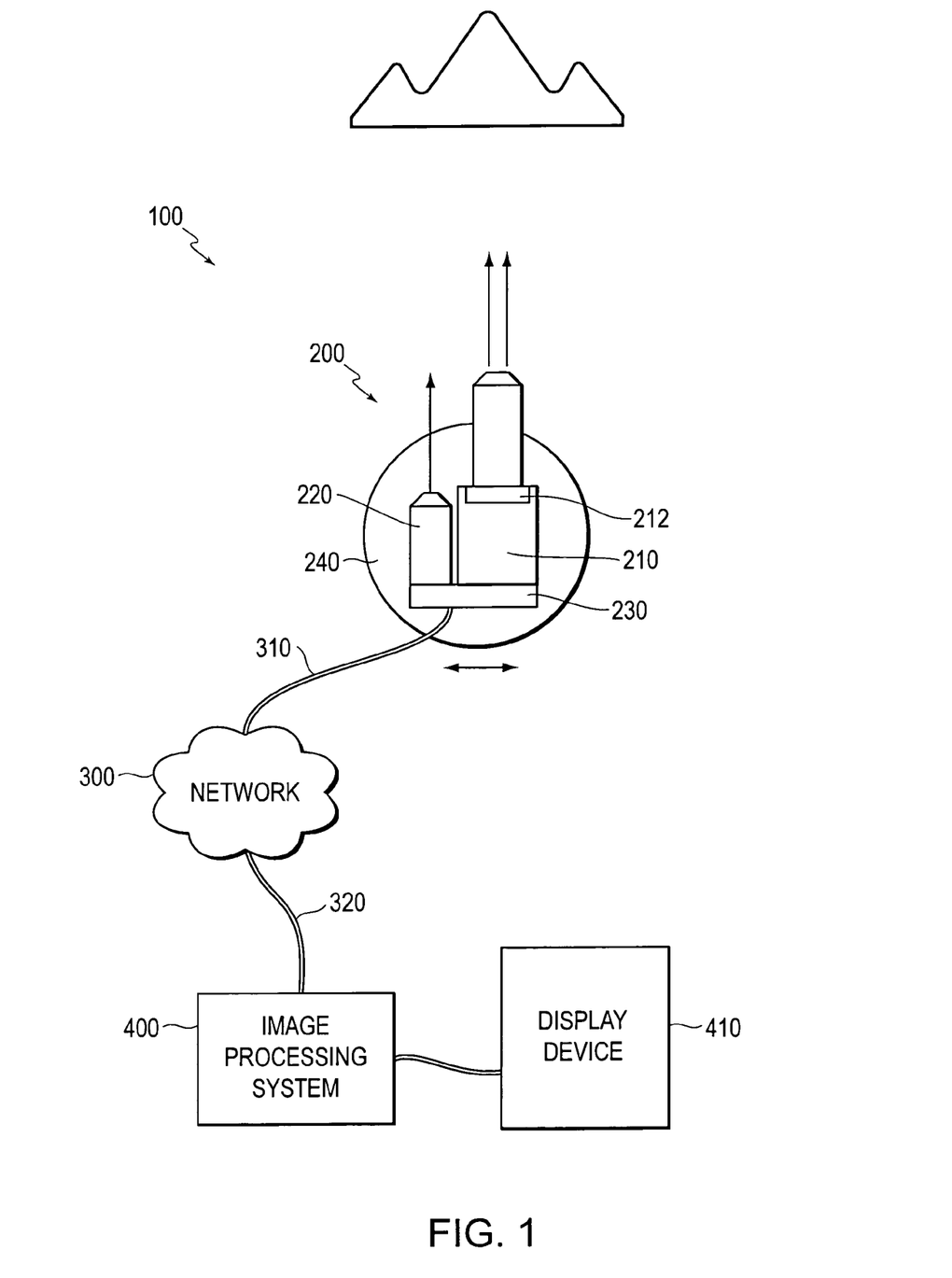
FIG. 1 illustrates one exemplary embodiment of a 3-D imaging system according to the invention.

FIG. 1 shows an exemplary block diagram of a 3-D imaging system 100 that includes an image and range data collection device 200, a network 300, an image processing system 400 and a display device 410. The image and range data collection device 200 includes a camera 210, a range finder 220, a control system 230 and a base 240. In various exemplary embodiments, the camera 210 captures a target image using a pixel array 212 such as, for example, a charged coupled device (CCD), CMOS pixel array or any known or future developed device that is able to capture image data. In various exemplary embodiments, the camera 210 may be a one-dimensional or line scanning camera. In various other exemplary embodiments, the camera 210 can capture two-dimensional images using a two-dimensional pixel array 212.

The range finder 220 may be a laser range finder. The control system 230 controls the operation of the camera 210 and the range finder 220. In various exemplary embodiments, the camera 210 and the range finder 220 are mounted on the base 240 already pre-calibrated with each other. As a result, the image captured by the camera 210 can be directly cross-referenced with range data generated by the range finder 220 in a known coordinate system, such as a coordinate system having origin at the pixel array 212 of the camera. For example, each range reading taken by the range finder 220 can be correlated by the control system 230 to a point along the X and Y axes of image portion captured by the pixel array 212 of the camera 210. Thus, when an image is captured at the pixel array 212, for a selected point in the image, the pixel array can be used to provide the X and Y coordinates for that point and the range finder 220 provides the Z-coordinate for that point.

It should be appreciated that the captured image is captured with respect to the position of the image and range data collection device 200. Thus, the above-described coordinate system having origin at the pixel array is a camera coordinate for that position of the range data collection device 200. If the position of the image and range data collection device 200 is changed to capture a different view of the object, the captured imaged will have a different camera coordinate to that of the camera coordinate in the previous position of the image and range data collection device 200. As a result, the camera coordinate is relative to the position of the image and range data collection device 200.

The base 240 is adapted to be movable such that, under the control of the control system 230, the base 240 moves the position of the camera 210 In various exemplary embodiments, the control system 230 outputs a control signal that moves the camera in step increments via the base 240. The step increment may be linear or angular. The step increment is usually no larger than the scan width of the camera 210. Once in position, the control system 230 signals the camera 210 to capture an image, which is usually a portion of the target image. The control system 230 then retrieves the captured image portion from the camera 210 and may store that image portion in a memory.

The image portion may have as its length the vertical resolution of the camera 210. However, the width of the image portion may vary according to a desired scan width. For example, the width may be one pixel wide or the width may be multiple pixels wide. In various embodiments, the scan width of the camera 210 may be adjustable so that, for example, a user may choose between the number of image portions to be captured and the number of range readings needed for each captured image portion.

Prior to the camera 210 being moved to the next step increment position, the control system 230 also outputs a control signal to the range finder 220 to perform a range reading at each of one or more positions on the surface of the object that appear in the image portion captured by the camera 210 for that step increment position of the camera 210. The control system 230 then receives the one or more range readings from the range finder 220 and stores the one or more range readings in the memory. In various embodiments, the spacing of each position read by the range finder 220 on the object is determined by the pixel resolution of the pixel array of the camera 210. Thus, the range data for each reading can be associated with a specific pixel within the image portion captured by the pixel array of the camera 210. In various exemplary embodiments, the control system 230 may concurrently signal the range finder 220 to perform the range readings with the signal to the camera 210 to capture a portion of the target image. When all of the desired number of range readings are made for the captured image portion, the control system 230 outputs a control signal that moves the base 240 to the next step increment. Another image portion is captured and the range data reading is repeated. Once the base 240 has moved a desired number of step increments, the image and range data collection device 200 will have stored in memory the desired number of image portions and the desired number of range readings.

In various embodiments, after the base 240 has moved the desired number of step increments, or as the base 240 is moving through the desired number of step increments, the control system 230 proceeds to assemble the captured target image portions into a single set of continuous image data that represents the target image. The image portions are usually assembled in the sequence in which the image portions were received from the camera 210. Because each image portion is associated with range data read by the range finder 220, a range map may be created from the range data that correspond with positions in the image portions from which the readings were made. In various embodiments, once the range map has been assembled, at least one of the range data may be used as a reference from which all other range data may be compared. In such exemplary embodiments, the difference between the other range data and the reference range data is the depth or z-buffer for that position in the continuous image data.

In various embodiments, the image and the range data collection device 200 may be further coupled to the network 300 though a communication link 310 and the network 300 may be coupled to the image processing system 400 though a communication link 320. The image and the range data collection device 200 transmits the continuous image data with depth data to the image processing system 400, which performs rendering using known applications to create a 3-D image. The imaging system 400 may then display the 3-D image in a display 410 coupled to the image processing system 400.

The network 300 may be a single network or a plurality of networks of same or different types. The network 300 may be a wired network, a wireless network or a combination of the two. The network 300 can be a local area network, a wide area network, a storage area network, an intranet, an extranet, the Internet, or any other distributed processing and/or storage network. In various exemplary embodiments, the network 300 may be a wireless network in connection with the Internet.

Figure 2:
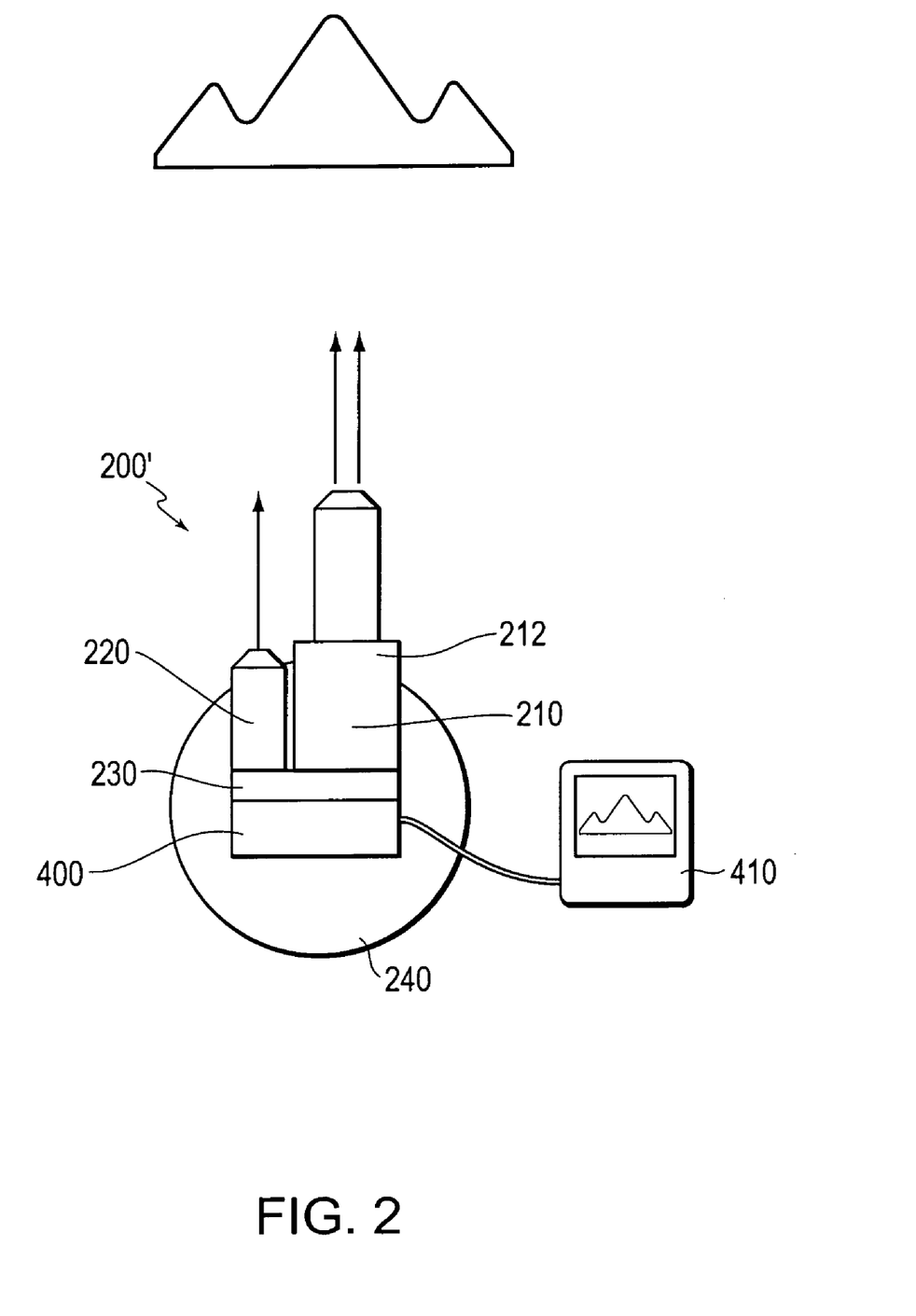
FIG. 2 illustrates a second exemplary embodiment of the 3-D imaging system according to the invention.

FIG. 2 illustrates a second exemplary embodiment of a 3-D imaging system 200' according to the invention. As shown in FIG. 2, the 3-D imaging system 200' includes a camera 210, a range finder 220, a control system 230 and a base 240. The 3-D imaging system 200' further includes a image processing system 400 and a display 410. The camera 210, the range finder 220, the control system 230 and the base 240 each operates in a manner similar to that described with respect to the image and range data collection device 200 of FIG. 1. However, the image processing system 400 performs rendering on the continuous image data with depth data assembled by the control system 230 using known applications to create a 3-D image. The 3-D image may then be displayed in the display 410 coupled to the image processing system 400.

It should be understood that the control system 230 and the image processing system 400 can be integrated as a single system. Alternatively, the control system 230 and the image processing system 400 can be implemented as physically distinct hardware circuits within an ASIC, using a FPGA, a PLD, a PLA or a PAL, using discrete logic elements or discrete circuit elements, or as physically distinct routines and/or applications executed on a programmed microprocessor, microcontroller or digital signal processor. The particular form the control system 230 and the image processing system 400 will take is a design choice and will be obvious and predictable to those skilled in the art. In various exemplary embodiments, the display 410 may be a gray scale or color LCD or plasma display monitor.

Figure 3:
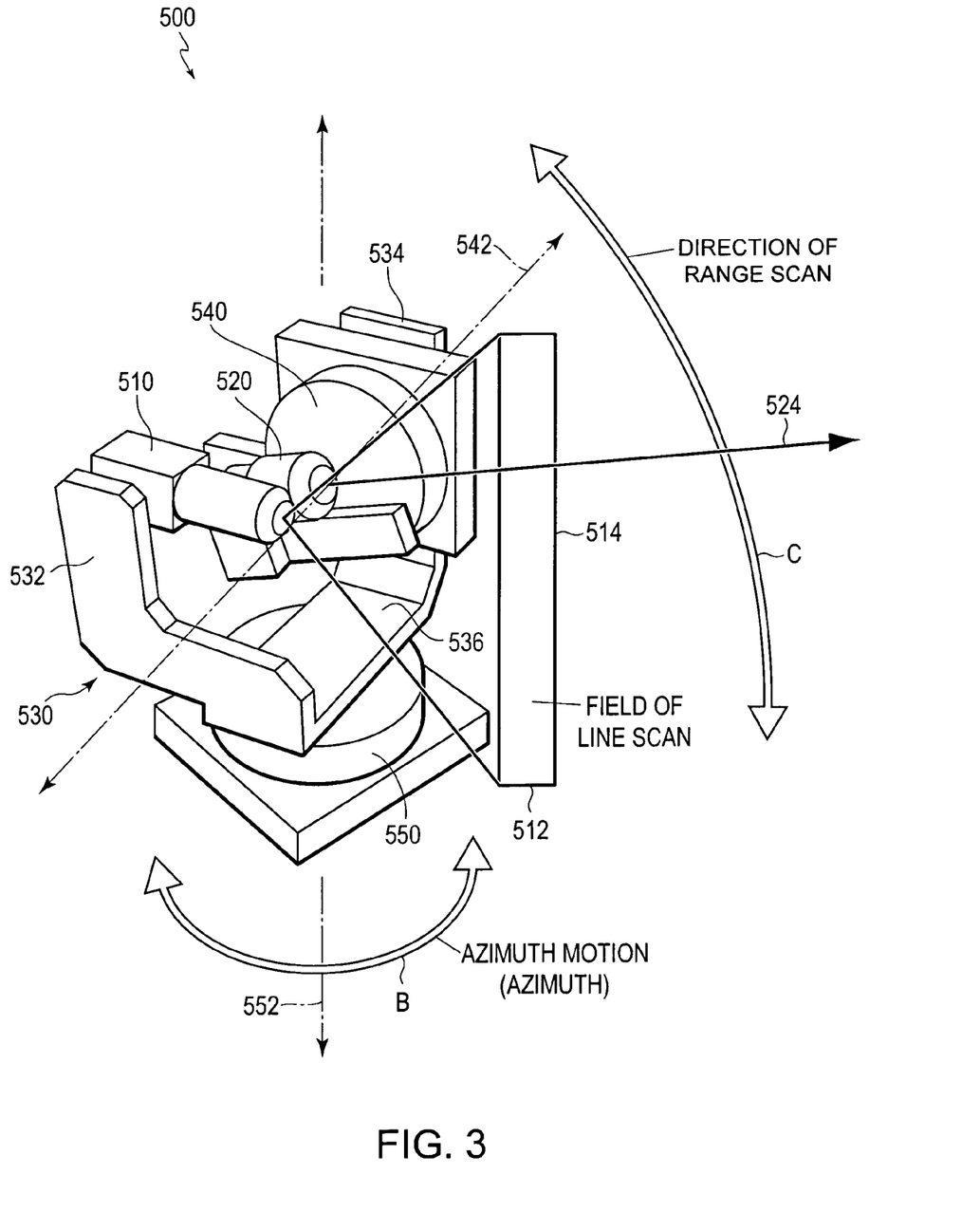
FIG. 3 illustrates one exemplary embodiment of an image and range data collection device according to the invention.

FIG. 3 illustrates a third exemplary embodiment of an image and range data collection device 500 according to the invention. The image and range data collection device 500 includes a camera 510, a laser range finder 520 and a base 530. As shown in FIG. 3, the base 530 is a U-shaped bracket having two arms 532 and 534 connected to a base plate 536. The camera 510 is rigidly mounted at one end of the bracket arm 532. A first stepper motor 540 is mounted at one end of the other bracket arm 534. The laser range finder 520 is attached to the rotatable part of the first stepper motor 540 such that the laser range finder 520 is movable with respect to the bracket arm 534. A second stepper motor 550 is mounted at the bottom of the base plate 536.

The first and second stepper motors 540 and 550 provide a two-degree-of freedom positioning system with a first axis 552 providing a rotatable motion in azimuth about the base plate 536 and with a second axis 542 providing motion in elevation about the bracket arm 534 on which the first stepper motor 540 is mounted. Limits in the elevation motion are arranged such that the laser range finder 520 may sweep the entire vertical resolution resolved by the camera 510.

In operation, the azimuth motion rotates stepwise along an azimuth direction B. In particular, each angular increment in rotation is no larger, and may be smaller, than the angular resolution along the direction B of each image portion recorded by the camera 510. As shown in FIG. 3, the camera 510 has a resolution that is limited by the scan width 512 and the vertical scan resolution 514. This limitation causes the camera 510 to capture a target image one portion at a time. At each step, the elevation motion of the first stepper motor 540 sweeps the laser range finder 520 from one limit of the motion along an elevation direction C to the other limit of the motion along the elevation direction C to cover at least the vertical resolution 514 of the camera 510. In various embodiments, the laser may be in the visible range or in the non-visible range such as infrared or ultraviolet.

In particular, in various exemplary embodiments, during the motion along the elevation direction C, the laser range finder 520 emits a laser beam at predetermined positions along the elevation direction C. The laser beam 524 bounces off the object being imaged and is detected by a laser detector in the laser range finder 520. The laser range finder 520 then determine the distance from the camera 510 to that portion of the object being imaged for that position along the elevation direction.

In various embodiments, the laser range finder 520 is set at limited range. That is, if the laser detector does not detect the reflected laser beam 524 within a certain of time after the laser beam 524 was emitted, the laser range finder 520 considers the range for that position to be infinite or that there wasn't a portion of the object being imaged for that position and does not register a range. That is, the range is given a zero value or any other predetermined value for that position.

After the laser range finder 520 has completed sweeping the laser beam 524, the laser range finder 520 may return to its original position. However, in various other exemplary embodiments, the laser range finder 520 may perform a downward sweep for one azimuth position and may perform an upward sweep for the next azimuth position. In any case, once the laser range finder 520 has completed sweeping the laser beam 524, the second stepper motor 550 is activated to rotate the base 530 to the next azimuth position where the next image portion is captured and the range data collection process is repeated. The second stepper motor 550 continues to rotate the base 530 through additional azimuth positions until the camera 510 has been rotated through a desired arc of rotation, in which case, operation terminates.

Figure 4:
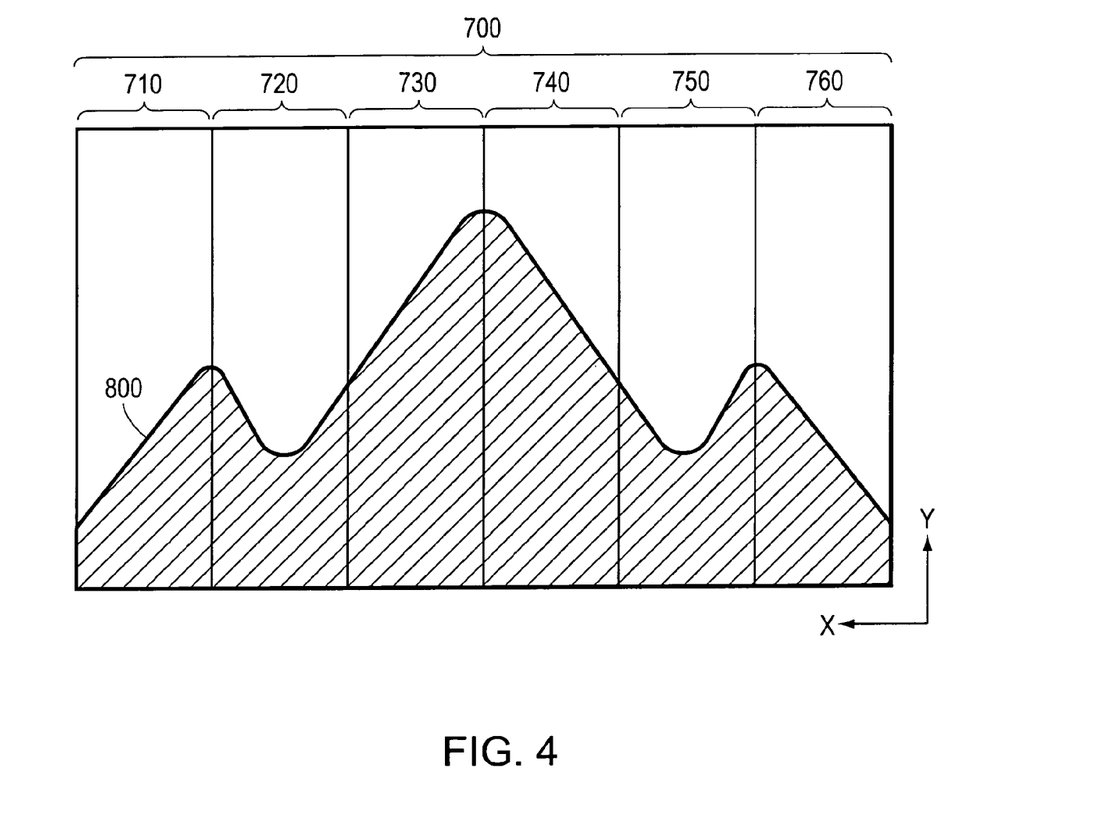
FIG. 4 illustrates one exemplary embodiment for an image of an object to be captured into a plurality of image portions.
Figure 5:
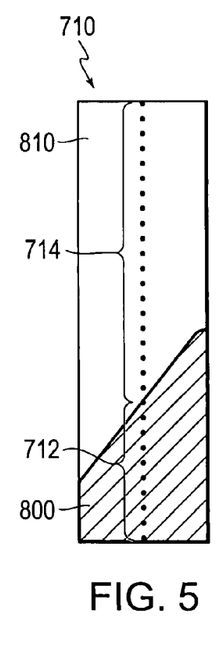
FIGS. 5–10 illustrate the image data and range data for each of the image portions of FIG. 4.

FIG. 4 illustrates an object 800 to be imaged and the image portions 710, 720, 730, 740, 750 and 760 that will be used to form the image 700 obtained from this object 800. To simplify the understanding of this exemplary operation, only six image portions 710, 720, 730, 740, 750 and 760 are shown in FIGS. 4–10. However, the number of image portions used can be any number usable to achieve a desired result. The shown image is an accumulation of captured image portions 710, 720, 730, 740, 750 and 760 using the pixel array of a camera. The width of each image portion generally corresponds to the scan width of the camera. The length of each image portion generally corresponds to the vertical resolution of the camera. If the origin of the camera coordinate is selected as the bottom left edge of the image 700 with the Y-axis of the coordinate radiating from the origin along the vertical direction of the image 700, and the X-axis coordinate radiating from the origin along the horizontal direction of the image 700, then all pixel positions in the image portions 710, 720, 730, 740, 750 and 760 can be defined as X-Y coordinates in that camera coordinate system. Stated differently, the image slices 710, 720, 730, 740, 750 and 760 captured by the camera defines the image 700 in two-dimensions in a camera coordinate system.

FIGS. 5–10 illustrate the image data and range data for each of the image portions 710, 720, 730, 740, 750 and 760 of FIG. 4. In particular, in FIGS. 5–10, only a single range data reading is taken for each pixel positions along the Y-axis. For exemplary embodiments where the image portions are one pixel wide along the X-axis, the range data is obtained for every pixel in the camera. For exemplary embodiments where the image portions are two or more pixels wide along the X-axis, the range data repeats the range data for a single pixel along each row, such as a central pixel. However, it should be appreciated that, when each row has two or more pixels, generally one range data reading will be generated for some or all of the two or more pixels.

As shown in FIGS. 5–10, the camera is activated to capture the image portion 710, 720, 730, 740, 750 and 760 respective of the target image 700. The dots illustrated in FIG. 5 and in FIGS. 6–10 represent range reading positions of the range finder in the image portions 710, 720, 730, 740, 750 and 760. The range finder is also activated to obtain range data at various predetermined positions 712 on the object and at various predetermined positions 714 on the background 810 corresponding to the vertical pixel positions of the image portion 710. In general, the range data for the positions 712 will correspond to a distance to the corresponding portion of the object 800 from the camera. In contrast, the background 810 is the sky, no return laser beam will be secured. As a result, the range data for the positions 714 will be defined as a predetermined value that represents that no actual range data was obtained for the positions 714 of the image portion 710.

The positions 722, 732, 742, 752 and 762 likewise represent pixel positions where range data was obtained, where the positions 724, 734, 744, 754 and 764 likewise represent pixel positions where range data was not obtained of the image portion 710 in a vertical sweep.

Because the X-Y coordinate of each pixel in each image portion 710, 720, 730, 740, 750 and 760 is known the positions of the range readings are known in the X-Y coordinate of the camera coordinate system. As will be apparent below, a range reading provides a depth or z-buffer for that position in the camera coordinate system. Not all positions will register a range reading because the range finder is adapted to register a reading up to a certain distance. For example, as discussed above, in FIG. 5, for the positions 712, the range finder will register range readings, but for the positions 714, the range finder will not register any readings. The captured image portion 710 and the range readings for the positions 712 and 714 are stored in memory.

Figure 6:
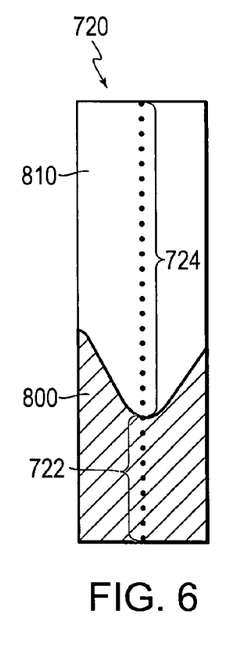

To obtain the image portion shown in FIG. 6, the camera and the range finder has been rotated horizontally by an angular step increment. The angular step increment is usually no more than the scan width of the camera. The camera is again activated to capture the next image portion 720 of the target image 700. The range finder is activated to obtain range readings at various positions 722 and 724 in the image portion 720. The captured image portion 720 and the range readings 722 and 724 are then stored in memory. Because the step increment is no more than the scan width of the camera, the captured image portion 720 is continuous with the previously captured image portion 710.

Figure 7:
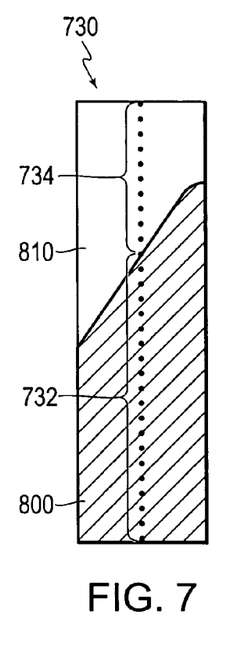
Figures 8, 9, 10:
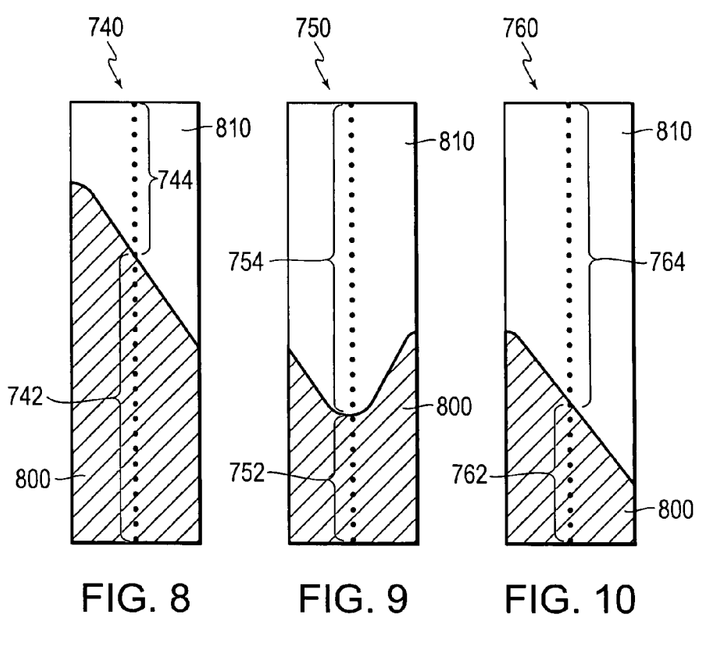

In FIG. 7, the camera and the range finder has again been rotated by one angular step increment. The camera is again activated to capture the next image portion 730 of the target image 700 and the range finders obtain range readings for positions 732 and 734. The captured image portion 730 and the range readings 732 and 734 are then stored in memory. In FIG. 8, the camera and the range finder has again been rotated by one angular step increment. The captured image portion 740 and the range readings 742 and 744 are then stored in memory. In FIG. 9, the camera and the range finder has been rotated by one angular step increment. The captured image portion 750 and the range readings 752 and 754 are then stored in memory. Finally, in FIG. 10, the camera and the range finder has been rotated angularly one step increment. The captured image portion 760 and the range readings 762 and 764 are then stored in memory.

Figure 11:
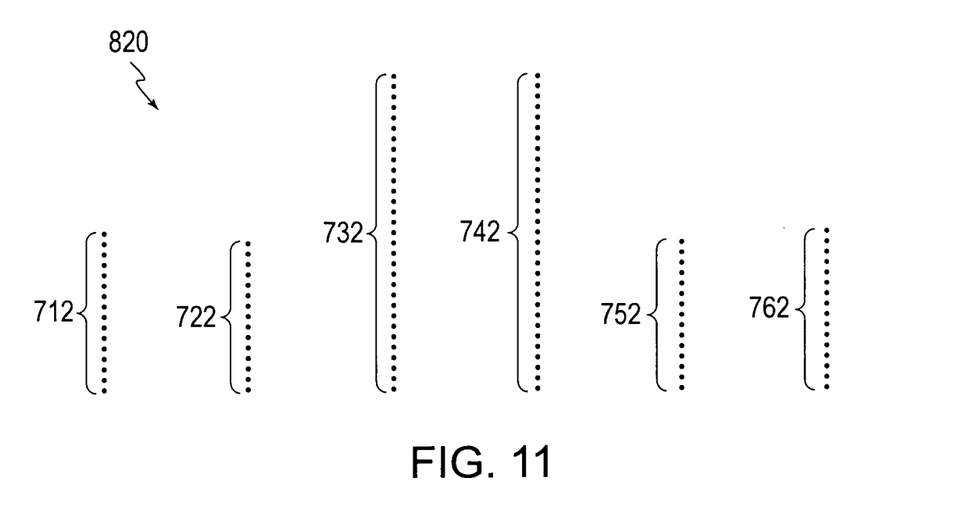
FIG. 11 illustrates one exemplary embodiment of an organization of the range data obtained for the image portions shown in FIGS. 5–10.

FIG. 11 illustrates an exemplary range map 820 which is an assembly of the pixel positions 712, 722, 732, 742, 752 and 762 for which range data was obtained in FIGS. 5–10. The X-axis and Y-axis positions of each pixel position 712, 722, 732, 742, 752 and 762 is defined in the camera coordinate system. The depth for those pixel positions 712, 722, 732, 742, 752 and 762 can be determined from the obtained range readings. For example, Once the range map has been assembled, in various exemplary embodiments, at least one of the range data may be used as a reference from which all other range data may be compared. In this case, the difference between the other range data and the reference range data is the depth or z-buffer for that position in the range map.

Figure 12:
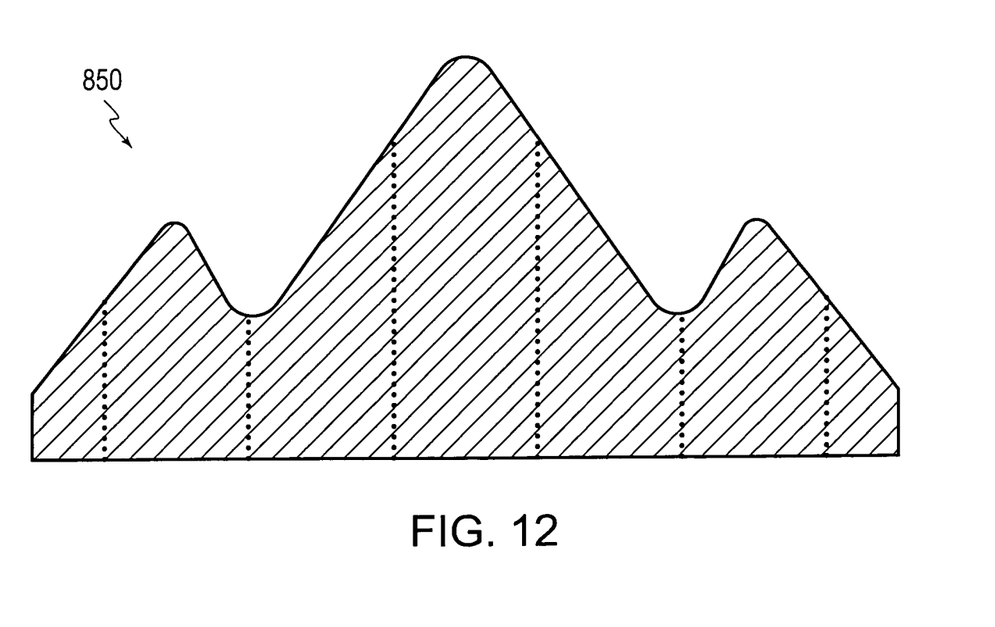
FIG. 12 illustrates the resulting image data and range information combined into a three-dimensional (3-D) image according to this invention.

FIG. 12 illustrates an exemplary constructed 3-D image 750 containing an object image corresponding to the object 800 using the assembled image portions 710, 720, 730, 740, 750 and 760 and the depth readings derived from the range map. Because the image portions 710, 720, 730, 740, 750 and 760 define the 2-D image of the object 800 and the depth readings (z-buffers) are derived from the range map and the positions of the depth readings are known in the image portions 710, 720, 730, 740, 750 and 760, the 3-D image construction may be performed using known 3-D imaging applications. The 3-D image has as its coordinates the camera coordinate system. Because the origin of the camera coordinate system is known, the 3-D image in the camera coordinate system may be transposed to a different coordinate system such as a world coordinate system which may contain other 3-D images.

Figure 13:
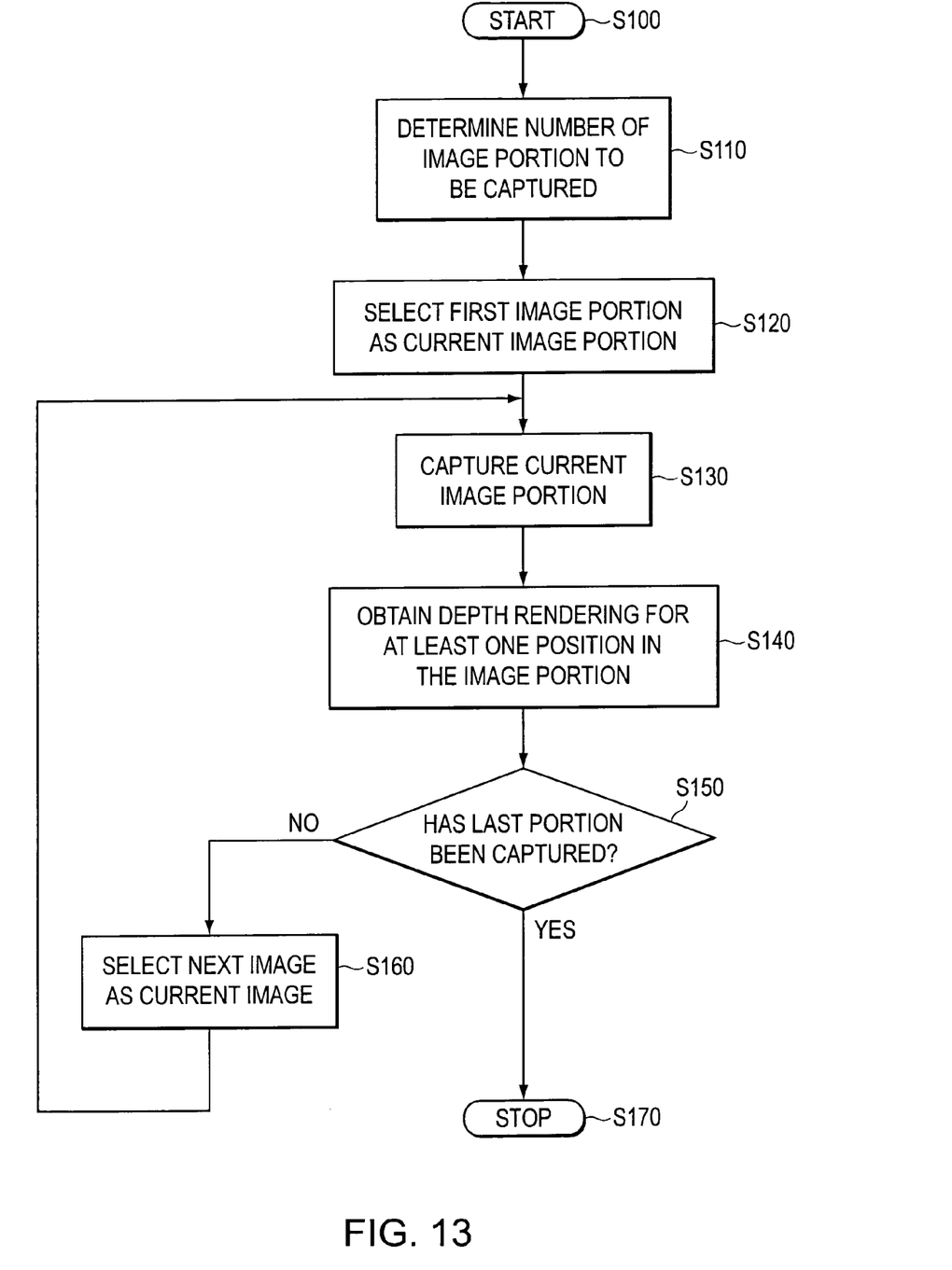
FIG. 13 is a flowchart outlining one exemplary embodiment of a method for capturing image portions and corresponding distance data according to the invention.

FIG. 13 is a flowchart outlining one exemplary embodiment of a method for capturing image portions and corresponding range readings according to the invention. As shown in FIG. 13, operation of the process begins in step S100, and continues to step S110, where the number of the image portions to be captured is determined. Then, in step S120, the first image portion is selected as the current image portion. Next, in step S130, the current image portion is captured. Operation then continues to step S140.

In step S140, a depth reading for at least one position in the current image is obtained. Next, in step S150, a determination is made whether the last image portion has been captured. If not, operation continues to step S160, where the next image slice is selected as the current image slice. Operation then returns to step S130 to repeat steps S130 to S150. Otherwise, if the last image portion has been captured, the operation continues to step S170, where the process terminates.

As shown in FIGS. 1–3, each of the control system and the image processing system is, in various exemplary embodiments, implemented using a programmed general purpose computer. However, each of the control system and the image processing system can also be implemented on a special purpose computer, a program microprocessor or a microcontroller and a peripheral integrated circuit elements, an ASIC or other integrated circuit, a digital signal processor, a hardwired electronic or logic circuit such as a discrete element circuit, a programmable logic device such as a PLD, PLA, FPGA or PAL or the like. In general, any device, capable of implementing a finite state machine that is capable of implementing the flowchart shown in FIG. 13 can be used to implement the control system.

Figure 14:
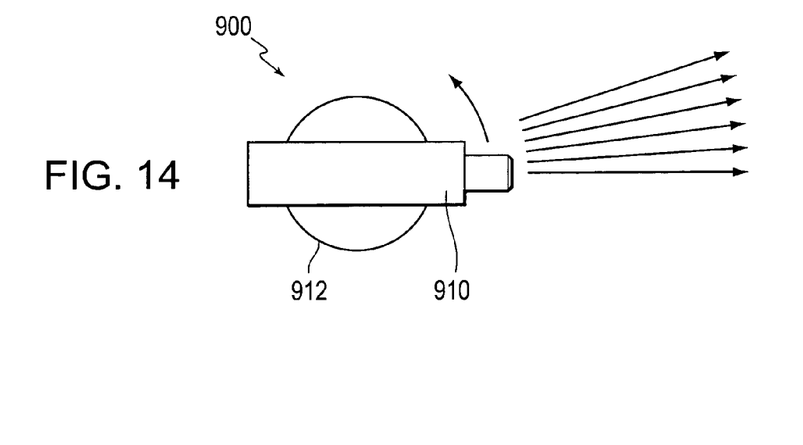
FIG. 14 is a side plan view of a first exemplary embodiment of a range finding device usable with the systems and methods according to this invention.

As shown in FIG. 14, the laser range finder 900 may include only a single laser 910 that is rotatable about a horizontal axis by a motor 912. At various positions as the single laser 910 is vertically swept, the laser range finder 900 emits a laser beam, which when reflected off an object, is detected by a laser detector contained in the laser range finder 900.

Figure 15:
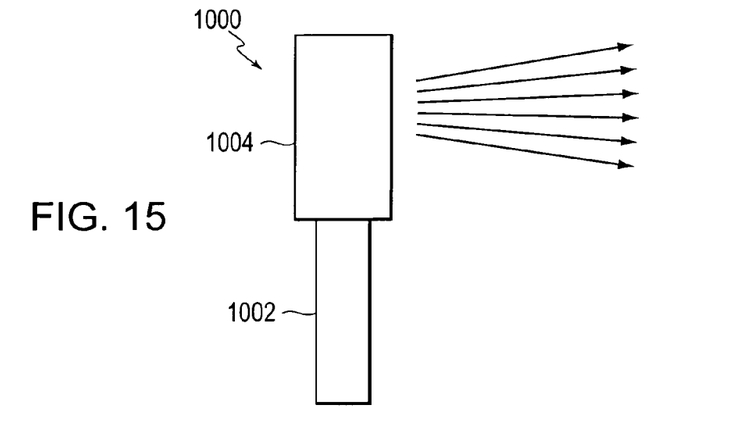
FIG. 15 is a side plan view of a second exemplary embodiment of a range finding device usable with the systems and methods according to this invention.

As shown in FIG. 15, the laser range finder 1000 may have a laser 1002 that is stationary and the emitted laser beam is directed to a laser diffractor 1004. The laser diffractor 1004 diffracts the laser beam into multiple laser beams that are each directed at a different portion of the target object. Each laser beam that is reflected off the target object is detected by one of a plurality of laser detectors, where there is a corresponding laser detector for each one of the multiple laser beam.

Figure 16:
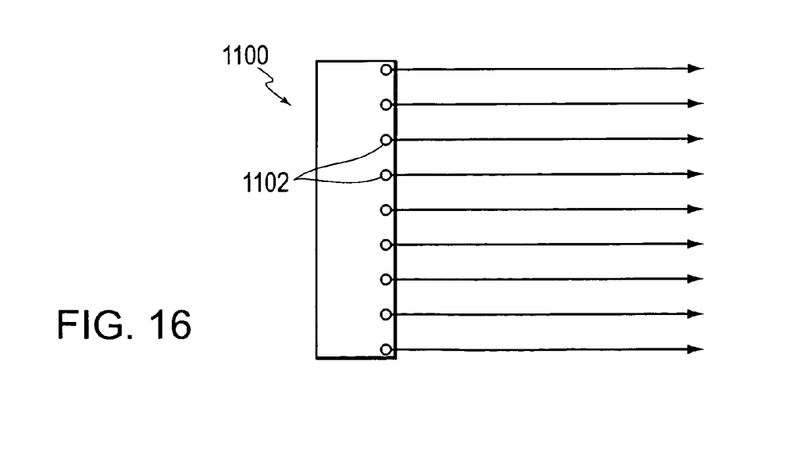
FIG. 16 is a side plan view of a third exemplary embodiment of a range finding device usable with the systems and methods according to this invention.

As shown in FIG. 16, the laser range finder 1100 may comprise a one or more laser emitters 1102 and corresponding laser detectors. Each laser emitter 1102 emits one or more laser beams. The emitted plurality of laser can be emitted simultaneously or sequentially at the target object. Each laser beam reflected off the target object is detected by the corresponding laser detector. The laser range finders as described in the FIGS. 14–16 are examples of laser range finders that may be used and should not be construed as limiting. Accordingly, other laser range finders may be used according to the scope and spirit of the invention.

In various embodiments, the memory can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-writable optical disk and disk drive, a hard drive, flash memory or the like. Similarly, the non-alterable or fixed memory can be implemented using any one or more ROM, PROM, EPROM, EEPROM, an optical ROM disk, such as a CD-ROM or DVD-ROM disk, and disk drive or the like.

While this invention has been described with specific embodiments thereof, it is evident that many alternatives, modifications and variations will be apparent to those skilled in the art. Accordingly, the preferred embodiments of the invention as set forth herein are intended to be illustrative and not limiting. Various changes may be made without departing from the spirit or scope of the invention.

What is claimed is:

1. A system usable to capture a three dimensional (3-D) image data, comprising:
   an image capture device that captures a plurality of portions of an image of an object, each captured portion of the image is based on a scan width of the image capture device;
   a range finding device that is a separate device from the image capture device, and obtains at least one range data value for each captured portion of the image, the at least one range data value being different from captured image data, and corresponding to a position in each captured portion of the image;
   a base to which the image capture device and the separate range finding device are mounted, the base adapted to move in increments based on the scan width of the image capture device; and
   a processing system that processes the plurality of captured portions of the image and the at least one range data value corresponding to the at least one position in the captured portion of the image to form a 3-D image.
   wherein, if a range data value is not obtained by the range finding device, the at least one range data value corresponding to the position in the captured portion of the image is set to a predetermined value, and
   the processing system selects a range data value reference as a depth buffer in the 3-D image to which each of the at least one range data value is referenced.

2. The system of claim 1, further comprising a control system that controls an operation of the image capture device, an operation of the separate range finding device and a movement of the base.

3. The system of claim 1, further comprising a memory usable to store the plurality of captured portions of the image and the at least one range data value corresponding to the at least one position in each captured portion of the image.

4. The system of claim 1, further comprising a display coupled to the processing system to display the 3-D image.

5. The system of claim 1, wherein the image capture device captures a portion of the image of the object in one dimension.

6. The system of claim 1, wherein the image capture device captures a portion of the image of the object in two dimensions.

7. The system of claim 1, wherein the scan width of the image capture device is variable.

8. A system usable to capture a three-dimensional (3-D) image data, comprising:
   a base;
   an image capture device mounted on the base;
   a range finding device that is a separate device from the image capture device, and is mounted on the base such that at least one range data value is read by the range finding device, the at least one range data value being different from data captured by the image capture device, the at least one range data value corresponding to a position in a captured image of the image capture device;
   a motor to rotate the base in an angular step increment that is no larger than a scan width of the image capture device; and
   a processing system that processes the plurality of captured portions of the image and the at least one range data value corresponding to the at least one position in the captured portion of the image to form a 3-D image.
   wherein, if a range data value is not obtained by the range finding device, the at least one range data value corresponding to the position in the captured portion of the image is set to a predetermined value, and
   the processing system selects a range data value reference as a depth buffer in the 3-D image to which each of the at least one range data value is referenced.

9. The system of claim 8, wherein the scan width of the image capture device is variable.

10. A method of generating a three-dimensional (3-D) image data comprising:
    capturing a portion of an image of an object with an image capture device;

obtaining at least one range data value for the captured portion of the image of the object with a range finding device that is a separate device from the image capture device, the range data value being different from captured image data, and relating to at least one corresponding position in the captured portion of the image; and assembling the captured portion of the image with a previously captured portion of the image of the object;

selecting a range data value reference as a depth buffer to which each of the at least one range data values is referenced; and processing the assembled captured portions of the image and, with each of at least one range data value corresponding to those captured portions referenced to the depth buffer, forming a 3-D image.

11. The method of claim 10, further comprising: assembling the obtained at least one range value for the captured portion of the image with a previously obtained at least one range value for the previously captured portion of the image, the assembly based on at least one corresponding position in the captured portion of the image and the at least one corresponding position of the previously captured portion of the image.

12. The method of 10, further comprising: displaying the 3-D image.

13. The method of claim 10, wherein capturing a portion of an image includes capturing the portion of the image in one-dimension.

14. The method of claim 10, wherein capturing a portion of an image includes capturing the portion of the image in two dimensions.

15. The method of claim 10, further comprising:
moving in a step increment to capture a next portion of the image of the object.

16. The system of claim 1, the base being mounted in a fixed position able to rotate around a fixed axis.

17. The system of claim 1, the base rotating the image capture device and the range finding device in increments in azimuth only.

* * * * *